United States Patent
Matsui et al.

(10) Patent No.: US 6,897,169 B2
(45) Date of Patent: May 24, 2005

(54) HIGHLY ENDURABLE HEAT INSULATING MATERIAL, METHOD FOR PRODUCTION THEREOF, USES THEREOF, AND WORKING METHOD THEREFOR

(75) Inventors: Taijiro Matsui, Kitakyushu (JP); Hiroshi Imagawa, Kitakyushu (JP); Tsuneo Kayama, Futtsu (JP); Shinji Aso, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 25 days.

(21) Appl. No.: 09/980,701

(22) PCT Filed: May 3, 2001

(86) PCT No.: PCT/JP01/01685

§ 371 (c)(1),
(2), (4) Date: Nov. 2, 2001

(87) PCT Pub. No.: WO01/64604

PCT Pub. Date: Sep. 7, 2001

(65) Prior Publication Data

US 2003/0017299 A1 Jan. 23, 2003

(30) Foreign Application Priority Data

Mar. 3, 2000 (JP) ........................................ 2000-058766

(51) Int. Cl.$^7$ ............................ B32B 27/12; C23C 4/00
(52) U.S. Cl. ........................ 442/136; 442/147; 442/172; 442/178; 442/179; 428/292.1; 428/293.9; 428/297.4; 428/920; 428/921; 427/446; 427/450; 427/452; 427/453
(58) Field of Search ................................. 428/920, 921, 428/292.1, 293.9, 297.4; 442/59, 136, 147, 172, 178, 179; 427/446, 450, 452, 453

(56) References Cited

U.S. PATENT DOCUMENTS 5,236,773 A * 8/1993 Sorathia et al. ............. 428/213

* cited by examiner

*Primary Examiner*—Ula Ruddock
(74) *Attorney, Agent, or Firm*—Kenyon & Kenyon (57) ABSTRACT

A fire-resistant heat insulating material excellent in resistance to heat, resistance to slag, resistance to molten iron, resistance to wear, and resistance to mechanical impulse is provided. A highly endurable heat insulating material characterized by being provided on the surface of a layer of inorganic heat insulating fibers through the medium of a coating film of surface hardening material with a flame sprayed film of a fire-resistant ceramic substance.

11 Claims, 3 Drawing Sheets

CERAMICS FIBER LAYER    SURFACE HARDENED LAYER

FLAME SPRAYED LAYER(S)

FIG. 3(b)

CERAMICS FIBER LAYER      FLAME SPRAYED LAYER(S)

HIGHLY ENDURABLE HEAT INSULATING MATERIAL, METHOD FOR PRODUCTION THEREOF, USES THEREOF, AND WORKING METHOD THEREFOR

TECHNICAL FIELD

This invention relates to a highly endurable heat insulating material, a method for the production thereof, and uses thereof, and more particularly to kilns, containers as for molten metal, flues, and automobile tunnels which use the highly endurable heating material as a refractory component, and a working method therefor.

BACKGROUND ART

Bricks are used as a refractory material for high temperature furnaces without posing any serious problem in terms of the ability to resist fire. Thus, they have been producing a long service life extending over many years. In recent years, efforts have been devoted to perfection of a technique for forming such bricks in lighter weight and smaller thickness with a view to diminishing such devices as furnaces and such structural members as tunnels in terms of mass, enhancing working efficiency copiously, and further enabling repair, when necessary, to be attained with simplicity.

Figure 2:
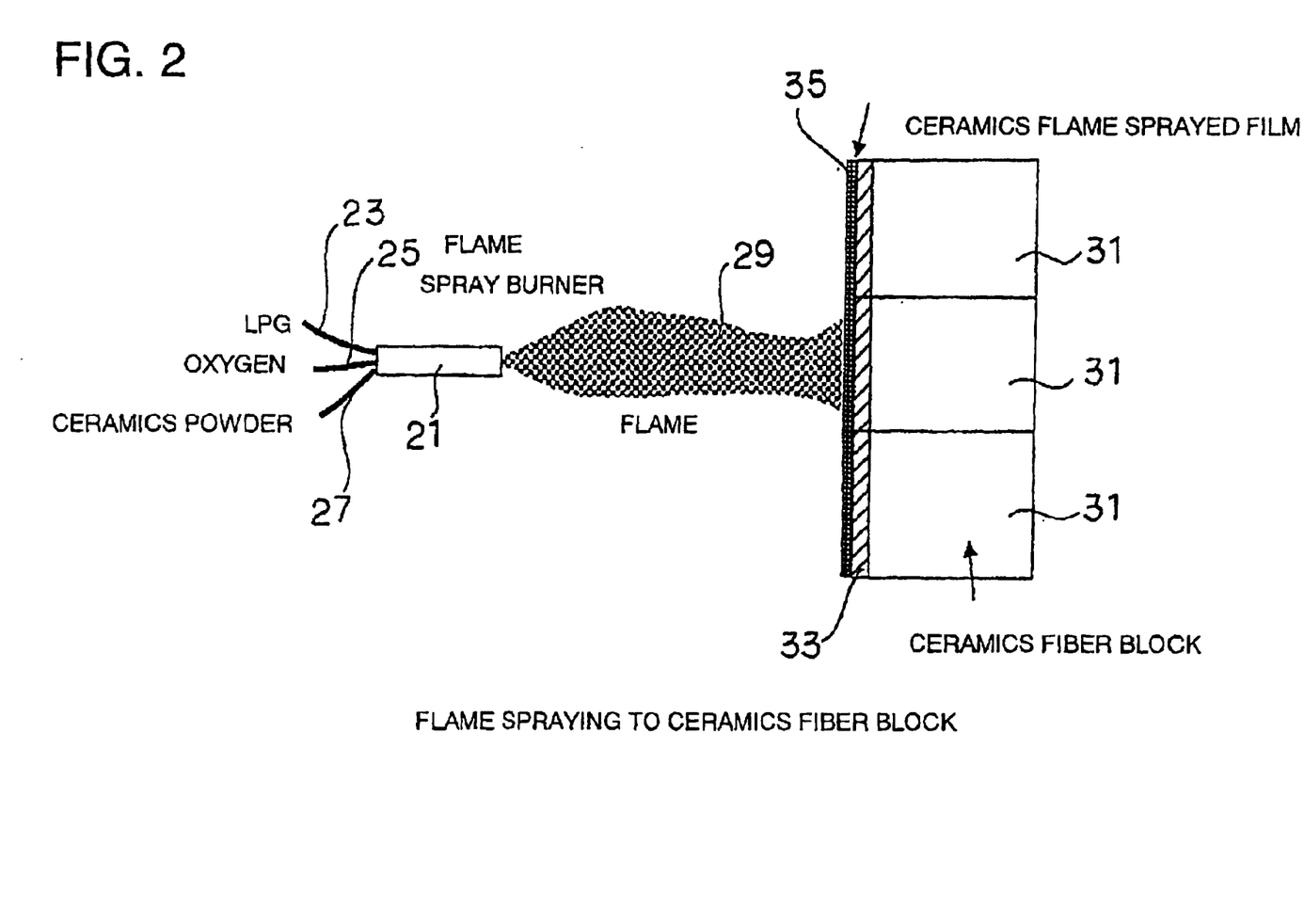
FIG. 2 is a schematic diagram illustrating the manner of performing a lava flame-spraying operation in the method for the production of the highly endurable heat insulating material contemplated by this invention.

The official gazette of JP-A-62-288,183 discloses a method for producing a fire-resistant composite material possessing satisfactory surface strength and comprising a thin fire-resistant layer by frame-spraying a refractory ceramic substance on a shaped article of fire-resistant fibers. Specifically, what is obtained by flame spraying in a plasma jet a zirconia powder having a particle diameter of not more than 0.3 mm on the surface of a zirconia fiber blanket (the shaped article of fire-resistant fibers) as illustrated in FIG. 2 inserted in the official gazette thereby forming thereon a rigid dense layer of zirconia measuring 2 mm in thickness and manifesting exclusively therein an apparent porosity of 5% and a bending strength of 150 kg/cm$^2$ is disclosed. In this disclosure is given a description to the effect that only the surface layer 2 mm in thickness in the whole zirconia fiber refractory composite possesses a rigid texture and the remainder thereof retains a fluffy state which is peculiar to fibers.

Indeed, the use of the fire-resistant composite material for clean firing light-weight furnace members, ceiling members for the production of electronic elements and ceramic elements, and ceiling members in high-temperature furnaces which have comparatively mild use conditions is described. This fire-resistant composite material, however, is deficient in endurableness when it is used at such sites as impose severe use conditions. When the fiber blanket is used as a shaped article of fire-resistant fibers, this fiber blanket and a fire-resistant ceramic substance to be used jointly therewith are liable to peel because their bonding strength is weak. In the existing state of technique, a fire-resistant heat insulating material which excels in endurableness (specifically, ability to resist heat, ability to resist slag, ability to resist molten iron, ability to resist wear, and ability to resist mechanical impacts) remains yet to be discovered.

It is, therefore, an object of this invention to provide a fire-resistant heat insulating material which excels in heat-resisting property, slag-resisting property, molten iron-resisting property, wear-resisting property, and mechanical impact-resisting property.

Another object of this invention is to provide a fire-resistant heat insulating material which can be extensively utilized for walls, ceilings, lids, and covers in various kilns (including those for metals other than iron and steel) such as heating furnaces and hot air ovens, various kinds of flues, and automobile tunnels which impose severe work conditions.

Still another object of this invention is to provide a fire-resistant heat insulating material which realizes a light weight and a small thickness with a view to diminishing such devices as furnaces and such structural members as tunnels in terms of mass, enhancing working efficiency copiously, and further enabling repair, when necessary, to be attained with simplicity.

DISCLOSURE OF INVENTION

The present inventors, as a result of pursuing a diligent study with a view to attaining the objects mentioned above, have perfected this invention. The objects of the invention mentioned above are accomplished by the following items (1)–(9).

(1) A highly endurable heat insulating material characterized by being provided on the surface of an inorganic heat insulating fiber with a frame-sprayed film of a fire-resistant ceramic substance through the medium of a coating film of a surface hardening material.

(2) A highly endurable heat insulating material set forth in the item (1) mentioned above, wherein the inorganic heat insulating fiber is formed of one member or a combination of two or more members selected from the group consisting of alumina-silica substance, clay substance, zirconia, mullite, zircon, magnesia, calcia, dolomite, silicon carbide, silicon nitride, and carbon fibers.

(3) A highly endurable heat insulating material set forth in the item (1) or the item (2) mentioned above, wherein the high-temperature property of the surface hardening material is similar to the high-temperature property of the flame sprayed film of a fire-resistant ceramic substance.

(4) A highly endurable heat insulating material set forth in any of the items (1)–(3) mentioned above, wherein the fire-resistant ceramic substance is at least one member selected from the group consisting of simple substances of alumina-silica substance, refractory clay, zirconia, mullite, zircon, magnesia, calcia, dolomite, corundum, bauxite, alumstone, silicon carbide, and chromite and complexes thereof.

(5) In the production of a highly endurable heat insulating material set forth in any of the items (1)–(4), a method for the production of the highly endurable heat insulating material characterized by coating the surface of an inorganic heat insulating fiber with the raw material composition for the surface hardening material and then lava flame spraying a fire-resistant ceramic powder material on the raw material composition of the surface hardening material thereby forming a coating film of the surface hardening material and the flame sprayed film of the heat-resistant ceramic substance.

(6) A furnace characterized by possessing a highly endurable heat insulating material set forth in any of the items (1)–(4) mentioned above as part or whole of a fire-resistant article.

(7) A smoke discharging device characterized by possessing a highly endurable heat insulating material set forth in any of the items (1)–(4) mentioned above as part or whole of a fire-resistant article.

(8) A tunnel characterized by possessing a highly endurable heat insulating material set forth in any of the items (1)–(4) mentioned above as part or whole of a fire-resistant article.

(9) In working a highly endurable heat insulating material for the use set forth in any of the items (6)–(8) mentioned above, a working method characterized by setting an inorganic heat insulating fiber on an iron skin, a fire-resistant substrate, or a concrete, applying a surface hardening agent to the surface of the fiber, and subsequently forming a film of a fire-resistant ceramic substance by lava flame-spraying on the coat of the surface hardening agent.

BRIEF DESCRIPTION OF DRAWINGS

FIG. 1 is a schematic cross section illustrating a highly endurable heat insulating material contemplated by this invention and a process of production thereof;

BEST MODE FOR CARRYING OUT THE INVENTION

The highly endurable heat insulating material of this invention is characterized by being provided on the surface of an inorganic heat insulating fiber through the medium of a coating film of a surface hardening material with a flame sprayed film of a fire-resistant ceramic substance. Consequently, the flame sprayed substance is easily welded to the fiber and the ceramic film which has been flame sprayed at an elevated temperature avoids generating a crack even when cooled and shrunken and similarly avoids generating a crack even when thermally expanded or shrunken during the course of use and the flame sprayed film which exhibits an excellent endurableness in the form of resistance to heat, resistance to slag, resistance to molten iron, resistance to wear, and resistance to mechanical impact can be retained firmly. Thus, the highly endurable heat insulating material contemplated by this invention achieves the object of reducing weight and decreasing thickness with a view to diminishing such devices as furnaces and such structural members as tunnels in terms of mass, enhancing working efficiency copiously, and further enabling repair, when necessary, to be attained with simplicity and finds extensive applicability to walls, ceilings, lids, and covers in various kilns (including those for metals other than iron and steel) such as heating furnaces and hot air ovens, various kinds of flues, and automobile tunnels which impose severe work conditions.

The inorganic heat insulating fiber involved herein does not need to be particularly discriminated. A material which best suits the purpose of use may be properly selected therefor. Any of the inorganic heat insulating fibers known to the art can be properly utilized. As typical examples of the fiber in question, alumina-silica substance, refractory clay, zirconia, mullite, zircon, magnesia, calcia, dolomite, corundum, bauxite, alumstone, silicon carbide, and chromite as simple substances and complexes thereof may be cited. Preferred combinations of these substances are alumina, silica, and zirconia, mullite and zirconia, magnesia and dolomite, alumina, silica, and carbon fibers, magnesia, silica, and carbon fibers, and magnesia, chromia, silica, and zirconia, for example. The combinations heretofore known to the art may be properly utilized. Such combinations as are available on the market are also usable.

The form of the inorganic heat insulating fiber mentioned above does not need to be particularly discriminated. The inorganic heat insulating fiber may be formed in any of all conceivable shapes by the technique heretofore known for the shaping and processing of inorganic heat insulating fibers. The fiber can be processed in the shape most suitable for the purpose of use. As typical examples of the form, a block, a board, a web of felt, a blanket, a sheet of paper, a sheet of cloth, a tape, a rope, a plate, an angular pillar, a cylinder, a laminate formed of a suitable combination of such forms, and a shape so formed as to suit the intended use may be cited.

The inorganic heat insulating fiber in a various shape is allowed to assume a varying angle between the surface of the lamination of the fibers produced in the shape of a block, for example, and the surface formed by the coating film. When the flame sprayed film of a fire-resistant ceramic substance is formed through the medium of a coating film of a surface hardening material because the surface of the lamination of fibers produced in the shape of a block and the surface formed by the coating film are parallel, separation is liable to occur on the surface of the lamination of inorganic heat insulating fibers produced in the shape of a block. Since the fibers offer the smallest resistance to extraction when the surface of the lamination of fibers produced in the shape of a block and the surface formed by a coating film are parallel, the surface formed by the coating film and the surface of the lamination of inorganic heat insulating fibers are advantageously so selected as to include an angle incapable of causing them to become parallel. The case of forming the flame sprayed film of a fire-resistant ceramic substance through the medium of the coating film of a surface hardening material because the surface of the lamination of fibers produced to form a block is perpendicular to the surface formed by the coating film proves more advantageous because the surface of the lamination of inorganic heat insulating fibers produced to form a block allows no easy separation.

Figure 1A:
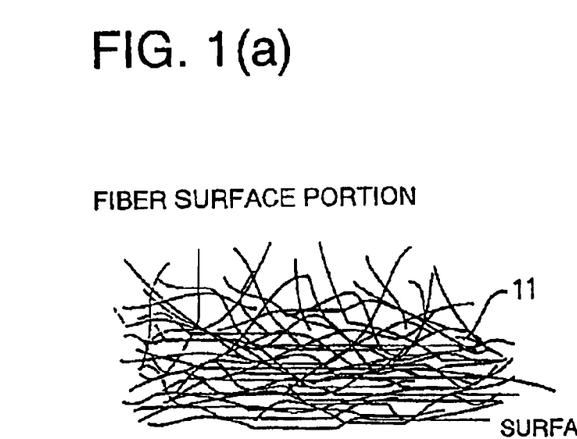
FIG. 1(a) a schematic cross section of the surface part of the inorganic heat insulating fiber, FIG. 1(b) a comparative diagram depicting the case of forming a flame sprayed film layer of a fire-resistant ceramic substance directly in the surface part of the inorganic heat insulating fiber, FIG. 1(c) a schematic cross section depicting the case of forming a coating film of a surface hardening material in the surface layer of fibers, and FIG. 1(d) a schematic cross section depicting completion of the formation of a flame sprayed film on the coating film of a surface hardening material.

The thickness of the lamination of inorganic heat insulating fibers cannot be uniquely defined because the optimum thickness varies with the manner of use and the purpose of use. It is, however, properly in the range of 0.1–500 mm and preferably in the range of 250–350 mm. The thickness proper for the manner of use and the purpose of use may be suitably selected within the range mentioned above. If the thickness is less than 0.1 mm, the shortage will be at a disadvantage in not enabling the lamination to secure a sufficient heat insulating property. Conversely, if the thickness exceeds 500 mm, the excess will be at a disadvantage in not only preventing the lamination, more often than not, from finding adoption on account of poor economy as compared with effect of heat insulation but also inducing the lamination, when the support (mode of formation) therefor happens to be such that the flame sprayed film of a fire-resistant ceramic substance may be formed on the surface opposite the surface of support (formation), to entail the possibility of rendering the retention of the form difficult as because of the shear stress due to the load exerted on the affected part and eventually depriving the lamination of the ability to attain stable retention of the form during the course of use. The term "thickness of the lamination of inorganic heat insulating fibers" as used herein refers to the thickness from the surface (on the side of forming the flame sprayed film of a fire-resistant ceramic substance) to the supporting (forming) surface on the opposite side. This thickness is variable as with the manner of using the lamination. As illustrated in FIG. 1(a) which will be specifically described herein below, the surface of an aggregate of inorganic heat insulating fibers possibly undulate as because of the phenomenon of fluffing. The thickness is only required to fall in the range specified above at any part of the aggregate.

Optionally the inorganic heat insulating fibers may be used in a compacted state with a view to improving the strength thereof. The density of the inorganic heat insulating fibers is generally in the range of 30–200 kg/m$^3$, preferably in the range of 60–190 kg/m$^3$, and more preferably in the range of 95–170 kg/m$^3$ for the purpose of keeping the heat insulating property and the forming processing property of the fibers intact in this while. If the bulk density of the inorganic heat insulating fibers mentioned above is less than 30 kg/m$^3$, therefore, enables the aggregate of fibers to enjoy high bulkiness and a satisfactory heat resisting property, the shortage will be at a disadvantage in forcing the aggregate of fibers to suffer lowered mechanical strength and consequently rendering the forming processing work difficult to perform and coming to limit the application of the fibers particularly to the part exposed to a load. Conversely, if the density of the inorganic heat insulating fibers exceeds 200 kg/m$^3$ and, therefore, enables the fibers to excel in the forming processing property, the excess will be at a disadvantage in coming to limit the application of the fibers to a field demanding a particularly high heat insulating property because it is difficult to heighten the heat insulating property by using bulky fibers and, in addition thereto, impairing the compressibility of the fibers and, more often than not, entailing the case of imparting widened meshes between the individual inorganic heat insulating fibers when the fibers are handled in the shape of a block.

The coating film of a surface hardening material mentioned above is only required to be capable of hardening and smoothing the surface of the layer of inorganic heat insulating fibers and allowing the flame sprayed film to adhere firmly to the surface. It is, however, preferable that the hot-temperature property of the coating film of the surface hardening material resembles the hot-temperature property of the flame sprayed film of a fire-resistant ceramic substance. The term "hot-temperature property" is used herein in a sense such that the expansion coefficient (X) which is the hot-temperature property of the coating film of the surface hardening material relative to the expansion coefficient (Y) which is the hot-temperature property of the flame sprayed film is properly in the range of $0.8Y \leq X \leq 1.2Y$, preferably in the range of $0.9Y \leq X \leq 1.1Y$, and more preferably in the range of $0.95Y \leq X \leq 1.05Y$. Particularly preferably for the purpose of allowing the hot-temperature properties of the two films to coincide, the coating film of the surface hardening material and the flame sprayed film of the fire-resistant ceramic substance are only required to have components of one and the same composition. It may well be concluded that most preferably, the components of the composition of the inorganic heat insulating fibers are similar to or identical with those of the composition of the coating film of the surface hardening material and the composition of the flame sprayed film of the fire-resistant ceramic substance. Owing to this coincidence, the coating film of the surface hardening material which forms the intermediate layer is enabled to adhere (by fusion) easily to both the layer of the inorganic heat insulating fibers and the flame sprayed film of the fire-resistant ceramic substance and consequently function as a powerful binder. In the coating film of the surface hardening substance, therefore, what is obtained by using an alumina-silica complex, for example, as a main inorganic component intended to impart a heat-resistant property to the film in a ratio of 60%, a well-known hardening component formed mainly of an inorganic substance such as, for example, colloidal silica or a silicate, a phosphate, ordinary cement, or alumina cement in a ratio accounting for the balance of 100%, water in a ratio in the range of 20 to 90% by volume, and such a macromolecular substance as polyvinyl alcohol or cellulose which is famous for the ability to endow the coating property with important viscosity additionally incorporated therein may be cited as an example of the surface hardening material. When this surface hardening material is applied to the surface of the inorganic heat insulating fibers, hardened, and dried, it forms a coating film.

The alumina-silica complex mentioned above as the main inorganic component for conferring the heat-resistant property mentioned above is an example which is not exclusive. As other typical examples of this inorganic component, clay, zirconia, mullite, magnesia, calcia, dolomite, silicon carbide, silicon nitride, and carbon fibers may be cited.

Further, such combinations as are formed of two or more members selected from the group mentioned above may be cited as other typical examples. As preferred examples of the combination of two or more members, alumina and silica and zirconia, mullite and zirconia, magnesia and dolomite, alumina and silica and carbon fibers, magnesia and silica and carbon fibers, and magnesia and chromia and silica and zirconia may be cited.

The water content of the solvent for mainly controlling the porosity of the coating film of the surface hardening substance applied, hardened, and dried as described above is increased to the standard of 90% by volume when the function of heat insulation and the function of deformation are heightened. There may be the occasions when the water content will not be relied on to control the porosity. The method which comprises in incorporating into the coating film a substance scattered by fluidification, combustion, or gasification during the course of drying by heating or after the formation of a coating film may be cited as one example. Such a well-known diluent as wax or polystyrene, for example, may be used as formed in a proper shape.

The composition of the surface hardening material does not need to be limited to any particular range but has only to be properly adjusted so as to acquire the viscosity fitting the particular method of application such as brushing, tromelling, manual spreading, spraying, or impregnation (doping) and consequently optimize the coating property.

The coating film of the surface hardening material produced as described above may be cited as an example.

The "coating film of the surface hardening material" which has been described above is an example and is only required to be vested with the role and the necessary properties which will be described specifically herein below.

The provision of the coating film of the surface hardening material which is implemented as described above proves to be a useful means for solving such technical problems of the conventional fire-resistant material using no surface hardening material as difficulty incurred in attempting adhesion of a flame sprayed film and, if the adhesion is attained at all, liability of the film to peel readily because of instability of the surface of adhesion. This point will be plainly explained below with the aid of a drawing.

A surface layer 11 of inorganic heat insulating fibers, as illustrated in FIG. 1(a), is formed to be bulky for the purpose of securing a heat insulating property and is found to be fluffy but never to be either flat or smooth.

Figure 1B:
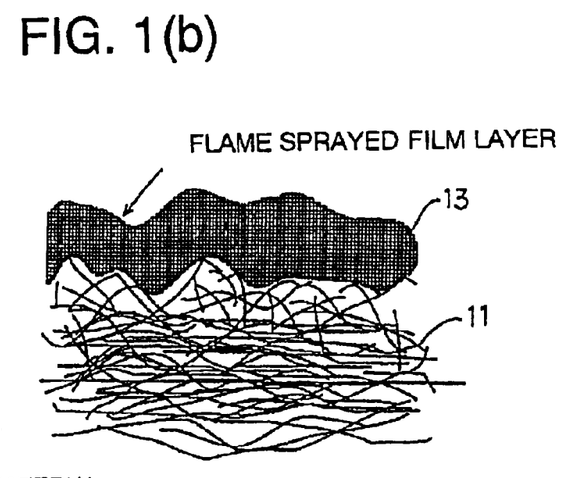

The existing fire-resistant material which is produced by forming a flame sprayed film of a fire-resistant ceramic powder on the surface layer of such fibers does not permit easy adhesion of a flame sprayed film layer 13 of a fire-resistant ceramic substance and, even when this adhesion is attained at all, suffers ready separation of this film layer 13 because the film layer 13, as illustrated in FIG. 1(b), is formed in the manner of following the undulating contour of the surface layer 11 of fibers and is not allowed to permeate the interior of the surface layer 11 of fibers.

Figure 1C:
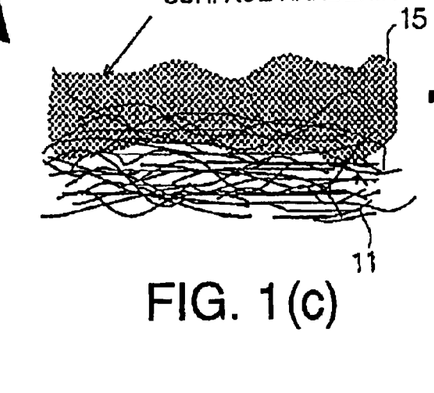

When the coating film of a surface hardening material is formed by properly applying the raw material composition of a liquid or pasty surface hardening material to the surface layer of fibers mentioned above, since the surface layer 11 of fibers is prevented from becoming fluffy as illustrated in FIG. 1(c) and the raw material composition of the surface hardening material is allowed to permeate the interior (gaps) of the surface layer 11 of fibers, a coating film 15 of the surface hardening material is enabled by the subsequent treatments of drying, heating, and drying to fasten firmly to the fibers in an intertwining manner. Consequently, the adhesive layer intervening between the surface layer 11 of fibers and the coating film 15 of the surface hardening material enjoys stability and suffers separation only sparingly and the surface of the coating film 15 of the surface hardening material enjoys improved flatness and smoothness.

Figure 1D:
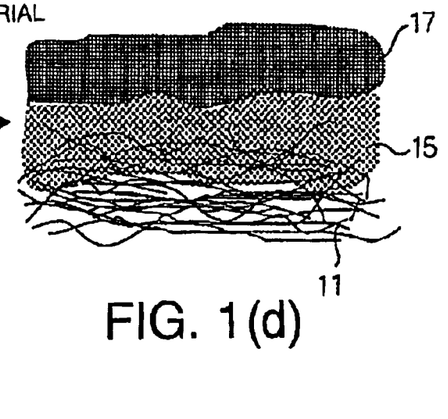

In the case of the endurable heat insulating material of this invention which is produced by flame spraying a fire-resistant ceramic powder on a surface coated with the raw material composition of the surface hardening material, therefore, since the adhesiveness (or fusibility) of the flame sprayed film to the surface of the coating film 15 of the surface hardening material is satisfactory as illustrated in FIG. 1(d), a flame sprayed film layer 17 resulting from the adhesion produces a stable surface of adhesion with the coating film 15 of the surface hardening material and warrants formation of a strong flame sprayed film which will not easily peel.

By forming the coating film of the surface hardening material, it is made possible to prevent effectively the fibers while at an elevated temperature from being deteriorated (owing to crystallization, for example) as by enabling the coating film of the surface hardening material to manifest a heat insulating effect during the course of flame spraying and producing an effect of keeping the heat of flame spraying from being directly transmitted to the fibers. When the raw material composition of the surface hardening material copiously permeates the interior of the layer of fibers, the heat insulating effect of the layer of fibers ceases to alter after reaching a certain degree. The thickness of the coating film of the surface hardening material, therefore, does not need to be increased very much. It is generally in the range of 0.1–10 mm, preferably in the range of 0.5–5 mm, and more preferably in the range of 1–3 mm. If the thickness of the coating film of the surface hardening material exceeds 10 mm, in spite of the absence of alteration of the heat insulating effect from the layer of fibers, the excess will be at an economic disadvantage in compelling the processing work to incur cost. Conversely, if the thickness of the coating film of the surface hardening material falls short of 0.1 mm, the shortage will be at a disadvantage in rendering the formation of a strong flame sprayed film difficult as by preventing the function inherent in the coating film of the surface hardening material from being manifested fully satisfactorily and possibly failing to repress the rise of fluffs from the surface layer 11 of fibers. Incidentally, the "thickness of the coating film of the surface hardening materia" as mentioned herein is not always uniform as illustrated in FIG. 1(c). Thus, the thickness of the coating film of the surface hardening material at any part thereof has to be in the range specified above.

The "coating film of the surface hardening material" as mentioned herein below does not need to be particularly discriminated but is only required to possess the role and the necessary properties which will be specifically described herein below.

1. Role (1) After the raw material composition of the surface hardening material has been applied to the surface of fibers and then dried, the surface hardening material forms a flat and hard coaling film layer on the surface of fibers.

The flame sprayed layer, therefore, is enabled to adhere beautifully to the surface without giving rise to any gap therein.

(2) During the application of the raw material composition of the surface hardening material, the liquid or pasty raw material composition of the surface hardening material permeates the interior of the fibers and forms a complex layer of the raw material composition of the surface hardening material with the fibers. The complex layer, after drying, forms an adhesive layer between the coating film (covering) layer solely of the surface hardening material and a layer of the inorganic heat insulating fibers (matric fibers).

(3) The coating film (covering) layer solely of the surface hardening material mentioned above additionally functions to protect the layer of the inorganic heat insulating fibers from the hot flame during the course of the flame-spraying.

(4) The flame sprayed layer of the fire-resistant ceramic substance is prevented from opening a crack in itself by following the motion of the flame sprayed layer of the fire-resistant ceramic substance which contracts during the course of cooking subsequent to the flame spraying.

(5) The role of a bond (binder) is fulfilled between the fibers and the frame-sprayed film.

2. Necessary Properties (1) The surface hardening material ought to be in a liquid and/or pasty state during the course of processing. It ought to permeate the interior of the layer of fibers to a certain degree. It ought to be simultaneously capable of forming a film layer on the surface.

(2) It ought to be capable of solidifying after drying and consequently forming a film layer with the complex layer of fibers.

(3) The film layer ought to be capable of following the behavior of cooling and shrinking manifested by the frame-sprayed layer. The ratio of cooling and shrinking of the film layer does not need to approximate closely to that of the flame sprayed layer. The texture of the layer of the surface hardening material is only required to be soft and loose and capable of deformation.

(4) The surface hardening material ought to be a fire-resistant heat insulating material. Preferably, it is a highly endurable fire-resistant insulating material which excels in durability of the form of resistance to heat, resistance to slag, resistance to molten iron, resistance to wear, and resistance to mechanical impact.

3. Quality of Coating Film of Surface Hardening Material and Example of Use (1) The coating film of the surface hardening material which possesses the role and the necessary properties mentioned above is basically made to acquire a coefficient of contraction by heating similar to that of the inorganic heat insulating fibers. For the purpose of exalting the corrosion-proofness of the coating film (covering) of the surface, the alumina-silica complex, for example, is preferred to have an alumina rich composition.

(2) In the percentage composition of the raw material composition of the surface hardening material which is the raw material for the coating film of the surface hardening material, the liquid portion is a dispersant or a solvent such as water and the solid portion is a surface hardening component such as filler particles (grains) or finely divided fibers. Optionally, this composition may additionally include therein an organic binder (manifesting strength at normal room temperature), an inorganic binder (manifesting strength at an elevated temperature), a dispersant (surfactant), etc. in suitable amounts.

(3) The finely divided fibers which are one kind of surface hardening material component are intertwined with the inorganic heat insulating fibers and the filler particles which are another kind of surface hardening material component and are enabled to manifest strength as coupled with the function of binder. The composition, therefore, is preferred to include therein the finely divided fibers in a suitable amount.

(4) The amount of the surface hardening material to be used is generally in the range of 0.5–30 kg/m$^2$ (0.3–18 kg/m$^2$ of solid content only), preferably in the range of 1.5–10 kg/m$^2$ (1.0–6 kg/m$^2$ of solid content only), and more preferably in the range of 3–10 kg/m$^2$ (1.8–6 kg/m$^2$ of solid content only) as reduced to the raw material composition of a liquid or pasty surface hardening material. If the amount of the raw material composition of the surface hardening material to be used falls short of 0.5 kg/m$^2$ (0.3 kg/m$^2$ of solid content only), the shortage will be at a disadvantage in rendering the formation of a strong flame sprayed film difficult as by preventing the coating film of the surface hardening material from being formed sufficiently on the surface of the layer of the inorganic heat insulating fibers and failing to repress the rise of fluffs from the layer of the inorganic heat insulating fibers. Conversely, if the amount of the raw material composition of the surface hardening material to be used exceeds 30 kg/m$^2$ (18 kg/m$^2$ of solid content only), the excess will be at a disadvantage in possibly failing to sufficiently repress manifestation of the rise of fluffs from the surface of fibers. The term "solid content" as mentioned herein is equivalent to the amount of the coating film of the surface hardening material (density) to be obtained by drying and calcining the raw material composition of the surface hardening material.

This invention uses the phrase "through the medium" in the statement that on the surface of the inorganic heat insulating fibers, the flame sprayed film of fire-resistant ceramic substance is provided "through the medium" of the coating film of the surface hardening material. This phrase implies that these three members may form a multilayer structure. It also embraces the case in which the coating film of the surface hardening material is in a multilayer structure on the theory that fine results are brought about by adopting for the inorganic heat insulating fibers' side of the surface hardening material a composition material having affinity therefor and adopting for the flame sprayed film side of the fire-resistant ceramic substance a composition material having affinity therefor. In this case, the coating film of the surface hardening material can be fastened more satisfactory by adhesion and consequently the adhesiveness (fusibility) of the flame sprayed film can be further improved.

The fire-resistant ceramic substance mentioned above does not need to be particularly discriminated but is only required to be properly selected so as to suit best the purpose of use. Any of the fire-resistant ceramic substances heretofore known to the art can be suitably utilized. At least one member selected from the group consisting of alumina-silica complex, refractory clay, zirconia, mullite, zircon, magnesia, calcia, dolomite, chammote, corumdum, bauxite, alumstone, silicon carbide, and chromite as simple substancess, and combinations of such simple substances may be cited. Preferred combinations are alumina and silica and zirconia, mullite and zirconia, magnesia and dolomite, magnesia and chromia and silica and zirconia, alumina and silica and magnesia, alumina and magnesia, and alumina and silica.

The thickness of the flame sprayed film of the fire-resistant ceramic material cannot be uniquely defined because the optimum thickness is varied with the manner of use and the purpose of use. From the viewpoint of securing endurableness (resistance to heat, resistance to slag, resistance to molten iron, resistance to wear, and resistance to mechanical impact), this thickness is properly in the range of 0.1–100 mm, preferably in the range of 0.5–50 mm, and more preferably in the range of 1–25 mm. The thickness may be properly selected in this range is selected so as to suit the manner of use and the purpose of use. If the thickness of the flame sprayed film of the fire-resistant ceramic material is less than 0.1 mm, the shortage will be at a disadvantage in preventing the durability from being secured sufficiently. Conversely, if the thickness exceeds 100 mm, the excess will be at a disadvantage in not only damaging the economy of the film by preventing the effect thereof from being proportionately increased because sufficient endurableness has been already secured but also possibly inducing exfoliation of the flame sprayed film under its own weight from the layer of fibers. The "thickness of the flame sprayed film of the fire-resistant ceramic material" as mentioned herein is not necessarily uniform as illustrated in FIG. 1($d$). The flame sprayed film of the fire-resistant ceramic material, therefore, is only required to have the thickness thereof at any part thereof fall in the range defined above.

The amount of the flame sprayed film of the fire-resistant ceramic material to be used is generally in the range of 0.5–500 kg/m$^2$, preferably in the range of 3–250 kg/m$^2$, and more preferably in the range of 5–125 kg/m$^2$. If the amount to be used is less than 0.5 kg/m$^2$, the shortage will be at a disadvantage in preventing the endurablensss from being sufficiently secured. Conversely, if the amount exceeds 500 kg/m$^2$, the excess will be at a disadvantage in not only damaging the economy of the film by preventing the effect thereof from being proportionately increased because sufficient endurableness has been already secured but also possibly inducing exfoliation of the flame sprayed film under its own weight from the layer of fibers.

Next, the method for producing the highly endurable heat insulating material does not need to be particularly discriminated but is only required to form the flame sprayed film of the fire-resistant ceramic material on the surface of the coating film of the surface hardening material by (1) applying the liquid or pasty raw material composition of the surface hardening material on the surface of a prescribed shape of the layer of inorganic heat insulating fibers in accordance with the known coating (painting) technique and (2) forming the flame sprayed film of the fire-resistant ceramic material on the surface of the coating film of the surface hardening material in accordance with the known flame spraying technique. Preferably, the method for producing the highly endurable heat insulating material is characterized by forming the lava flame sprayed film of the fire-resistant ceramic material on the surface of the coating film of the surface hardening material by a procedure which comprises applying the raw material composition of the surface hardening material to the surface of the layer of the inorganic heat insulating fibers and subsequently lava flame spraying the fire-resistant ceramic powder on the raw material composition of the surface hardening material.

The inorganic heat insulating fibers mentioned above have been already described, their explanation will be omitted here to avoid repetition.

The method for producing the inorganic heat insulating fibers does not need to be particularly discriminated. The heretofore known technique for producing inorganic heat insulating fibers such as the method for producing inorganic heat insulating fibers which is described in the official gazette of JP-A-63-60,125 covering a method and device for the production of inorganic fibers or the official gazette of JP-A-63-21,234 covering a method and device for production of inorganic fused substance may be suitably utilized. These are not the exclusive examples. The method which comprises spinning an alcoholate or alkoxide type organic-inorganic compound by the reaction of hydration during the course of synthesis is also conceivable.

The raw material composition of the surface hardening material mentioned above is only required to be a liquid or pasty substance which contains the components of the coating film of the surface hardening material mentioned above. This composition, on answering this description, is enabled to be effectively applied by the known coating technique to the surface of the layer of the inorganic heat insulating fibers. Thus, it is capable of satisfying the role and the necessary properties of the coating film of the surface hardening material defined above.

The raw material composition of the surface hardening material, therefore, may contain a volatile dispersant or solvent and, when necessary, further a proper dispersing agent (surfactant), a binder, a granular or fibrous organic substance for the formation of cells, and a polymeric compound for adjusting a dispersing substance besides the components of the coating film of a surface hardening material.

The components of the coating film of the surface hardening material is only required to be capable of forming a necessary coating film of surface hardening material by a procedure which comprises applying the components to a given substrate, then optionally drying the applied layer of the surface hardening material, and calcining this layer with the high heat generated during the course of the flame spraying. The components of the coating film of the surface hardening material already mentioned above are contained in the form of a granular filler or finely divided fiber. Particularly, the finely divided fibers are at an advantage in manifesting strength as intertwined with inorganic heat insulating fibers and filler particles and coupled with the function as a binder. The components (solid portion) of the coating film of the surface hardening material in the form of finely divided fibers account for a portion of the whole of the raw material composition of the surface hardening material generally in the range of 2–20 mass %, preferably in the range of 4–15 mass %, and more preferably in the range of 5–10 mass %. Commendably, the diameter of the fibers is in the range of 1–10 $\mu$m. The aspect ratio (lenth/diameter) is preferred to be in the range of 100–4000. If the diameter of the fibers is less than 1 $\mu$m, the shortage will be at a disadvantage in preventing the fibers from being easily produced. If the diameter exceeds 10 $\mu$m, the excess will be at a disadvantage in preventing the fibers from easily intertwining with the filler particles. If the aspect ratio is less than 100, the shortage will be at a disadvantage in preventing the fibers from easily intertwining with the filler particles. If the aspect ratio exceeds 4000, the excess will be at a disadvantage in preventing the formed film acquiring a uniform surface and rendering the flame sprayed film readily separable.

The total content of the components in the coating film of the surface hardening material is generally in the range of 35–95 mass %, preferably in the range of 40–80 mass %, and more preferably in the range of 55–75 mass %, based on the total raw material composition of the surface hardening material. If the total content is less than 35 mass %, the shortage will be at a disadvantage in rendering the formation of a strong flame sprayed film as by preventing the coating film of the surface hardening material from being sufficiently formed on the surface of the layer of inorganic heat insulating fibers and possibly not allowing satisfactory repression of the rise of fluffs from the layer of the inorganic heat insulating fibers. Conversely, if the total content exceeds 95 mass %, the excess will be at a disadvantage in preventing the raw material composition from being uniformly applied. The contents (percentage composition) of the individual components of the surface hardening material have been already described above and will be omitted here.

The components of the coating film of the surface hardening material generally are each formed of several species of chemical compositions. For the purpose of enabling the surface hardening material to assume a liquid or pasty form, all the components of the coating film of the surface hardening material invariably have a diameter generally in the range of 0.01–1000 $\mu$m, preferably in the range of 0.01–300 $\mu$m, and more preferably in the range of 0.01–100 $\mu$m, though variable with the form of the particles. If the diameter is less than 0.01 $\mu$m, the shortage will be at a disadvantage in rendering the production of the raw material difficult. Conversely, if the diameter exceeds 1000 $\mu$m, the excess will be at a disadvantage in preventing the surface hardening material from being applied uniformly.

The component of dispersant or solvent mentioned above is only required to be capable of effectively dispersing or dissolving the component of surface hardening material in the dispersant or solvent thereby enabling the raw material composition of the surface hardening material to assume a liquid or pasty state and attain easy permeation into the fibers. Though water may be cited as a concrete example of the component, this component does not need to be limited to water.

The dispersing agent (or the surfactant) which is optionally incorporated does not need to be particularly discriminated. It may be such a known substance as an inorganic dispersing agent, a surfactant, or a colloidal agent. Such a substance is not strictly wedded with its designation. It has only to be capable of effectively dispersing the components of the coating film of surface hardening material uniformly in the dispersant.

The binder which is further incorporated as occasion demands does not need to be particularly discriminated. An organic binder (manifesting strength at room temperature) and an inorganic binder (manifesting strength at an elevated temperature) which have been heretofore known may be suitable selected and utilized as the binder. As typical examples of the binder, colloidal silica, silicates, phosphates, ordinary cement, and alumina cement may be cited. These binders may be used singly or in the form of a combination of two or more members.

The term "application" as used herein does not need to be strictly wedded with this designation but ought to be interpreted in the broadest possible sense. It can be applied to the broad spectrum of known coating (or painting) techniques such as, for example, coating by brushing, tromelling, and manual spreading, coating by atomizing (blasting) by means of a sprayer, and coating by impregnation (doping). After the surface hardening material has been applied to a given substrate, the formed layer is preferred to be left spontaneously drying for 10–60 minutes and subsequently dried with the flame of a flame sprayer having a temperature in the range of 1000°–1500° C. for a period in the range of 1–20 minutes.

The quality of the fire-resistant ceramic powder which can be flame sprayed to either the coating film of a surface hardening material or the surface of the coating film of the raw material composition has been already described in the paragraph dealing with the flame sprayed film of the fire-resistant ceramic substance and, therefore, will be omitted from the following description.

The particle diameter of the fire-resistant ceramic powder does not to be particularly discriminated but is only required to be such that the powder will be fastened in a perfectly molten state with the thermal energy generated during the course of the flame spraying to the surface of a given substrate (specifically, the surface of the raw material composition of the surface hardening material applied to the surface of the layer of the inorganic heat insulating fibers or the coating film thereof). It is properly decided to suit the capacity of the flame sprayer or the purpose of use. It is generally in the range of 1–1000 $\mu$m, preferably in the range of 1–300 $\mu$m, and more preferably in the range of 10–210 $\mu$m. If the particle diameter of the fire-resistant ceramic powder is less than 1 $\mu$m, the shortage will be at a disadvantage in lowering the fluidity of the powder to the extent of rendering uniform discharge of the powder impossible, preventing the film from forming a uniform thickness, and suffering an unsolved layer to mingle in the flame sprayed film. Conversely, if this particle diameter exceeds 1000 $\mu$m, the excess will be at a disadvantage in preventing the fire-resistant ceramic powder from dissolving and consequently acquiring strong adhesiveness and infeasibilizing the formation of a dense highly strong product of processing.

During the course of flame spraying the fire-resistant ceramic powder, the raw material composition of the surface hardening material which has been applied to the surface of the layer of the inorganic heat insulating fibers may be properly dried and converted into a coating film or may not be dried. Though it may be otherwise dried and then heated to be strongly fastened to the substrate, the utilization of the heat of the flame spraying proves advantageous on account of excellent economy. This heat induces absolutely no problem even when the raw material composition of the surface hardening material is using a volatile or inflammable dispersant and an inflammable dispersant (surfactant) and an organic binder. The use of this heat is safe because the applied layer of the raw material composition of the surface hardening material is heated to an extremely high temperature by the flame spraying and therefore is easily burnt. The volatile component, therefore, does not serve to form a coating film of the surface hardening material of the highly endurable heat insulating material to be obtained. Most inflammable components do not serve to form a coating film of the surface hardening material but contain a residual component only sparingly.

The method for flame spraying the fire-resistant ceramic powder does not need to be particularly discriminated. Any of various heretofore known flame spraying techniques may be adopted. The method may be carried out by lava flame spraying, plasma spraying, arc spraying, etc. The method of lava flame spraying is commendable because it permits miniaturization of the device for flame spraying, excels in portability, and enjoys convenience of such works as carrying and handling. More specifically, the flame spraying techniques which are disclosed in the official gazette of JP-B-57-16,309, the official gazette of JP-B-57-56,668, the official gazette of JP-B-58-32,314, the official gazette of JP-B-58-46,545, the official gazette of JP-B-60-40,597, the official gazette of JP-B-60-54,258, and the official gazette of JP-B-61-10,418 may be utilized suitably.

As one example of the method for flame spraying, a typical operation of lava flame spraying will be described below with the aid of a drawing. As illustrated in FIG. 2, a fire-resistant ceramic powder having an average particle diameter of 20 $\mu$m, an oxygen source such as oxygen or an oxygen-rich gas, and a fuel source such as LPG are supplied via respective pipes 23, 25, and 27 to a flame spraying burner 21. In the burner 21, the fuel source such as LPG and the oxygen source such as oxygen are burned to generate a flame 29. This flame 29 spouted in conjunction with the flame-resistant ceramic powder. Consequently, the flame-resistant ceramic powder, while moving through the flame 29 spouted through the flame spraying burner 21 at a high temperature of not lower than 2000° C., is transformed into a thoroughly dissolved state, then blown together with the flame against the applying/coating surface of a coating film 33 of the raw material composition of the surface hardening material formed on the surface of the layer of inorganic heat insulating fibers 31, and consequently allowed to form a flame sprayed film 35 of the fire-resistant ceramic substance.

Next, the uses for which the highly endurable heat insulating material of this invention is intended are only required to be capable of harnessing the highly endurable heat insulating materia as part or whole of a fire-resistant substance. Specifically, furnaces, smoke discharging devices, and tunnels are concrete examples of the use.

The furnace contemplated by this invention is characterized by possessing the highly endurable heat insulating material mentioned above as part or the whole of the fire-resistant substance.

The furnace which is capable of adopting the highly endurable heat insulating material mentioned above as part or the whole of a fire-resistant substance does not need to be particularly discriminated. As typical examples of the furnace, kilns such as a heating furnace, a hot-air oven, a heat treat furnace, and an electric furnace; kilns for making iron such as a shaft furnace, a steel converter, and a smelting furnace; various metal smelting refining furnaces such as a casting smelting refining furnace, an aluminum smelting refining furnace, a zinc smelting refining furnace, and a copper smelting refining furnace; and a glass smelting furnace, a cement kiln, a lime kiln, a ceramic firing furnace, an incinerator, and a melting furnace may be cited, though not exclusively.

Further, in the furnace of this invention, the highly endurable heat insulating material mentioned above can be adopted as part or the whole of the fire-resistant substance. To be specific, it can be used in walls, ceilings, lids, and covers in various furnaces. Further, it can be also used in various molten metal conveying vessels such as various metal smelting refining containers, hot metal kettles, ladles, and torpedo carriers.

Particularly, in ceilings, covers for pig iron ladles steel lades, sealing covers of refinery grade, trough covers, and turn dish (hereinafter occasionally abbreviated as "TD") covers which have no need for such strength as is reached by the conventional refractory bricks, all the fire-resistant substances can be substituted for by the highly endurable heat insulating material of this invention. The substitution enjoys a highly satisfactory operational efficiency as in the partial repair and excels in economy because the repair, when necessary, is accomplished by simply replacing a broken part. Further, the whole furnace is enabled to attain a decrease in weight because such structures as support pillars and furnace walls which serve the purpose of supporting the ceiling allow a generous reduction in their strength for supporting the ceiling.

Then, the smoke discharging device contemplated by this invention is characterized by possessing the highly endurable heat insulating material mentioned above as part or whole of the fire-resistant substance.

As typical examples of the smoke discharging device, smoke stacks and flues may be cited.

Since the smoke discharging device has no need for such strength as is possessed by the conventional fire-resistant brick, it allows the whole fire-resistant substance thereof to be substituted for by the highly endurable heat insulating material of this invention. This substitution, therefore, enjoys a satisfactory operational efficiency and excels immensely in economy because it permits a generous reduction in the mass of the whole of structures and it allows a partial fracture, if sustained during the subsequent use of the device, to be repaired by replacing only the fractured part.

The tunnel according to this invention is characterized by possessing the highly endurable heat insulating material as part or the whole of the fire-resistant substance thereof.

As typical examples of the tunnel, road tunnels, railroad tunnels, and underground passages (underground tunnels) such as underground railways and underground shopping areas may be cited.

These tunnels use fire-resistant substances for the purpose of protecting tunnel concrete articles in case of fire and, therefore, direct an important consideration to the necessity for weight reduction. Particularly, when the highly endurable heat insulating material used in the ceiling of the tunnel accidentally incurs a collapse, the tunnel is safe because it has practically no possibility of inflicting damage to automobiles, electric railcars, and human beings.

The method (mode of execution) for utilizing the highly endurable heat insulating material as part or the whole of the fire-resistant substance in furnaces, smoke discharging devices, or tunnels which embody the use for the highly endurable heat insulating material of this invention does not need to be particularly discriminated. For example, the utilization may comprise forming the highly endurable heat insulating material in the shape of blocks of a fixed size similar to the existing bricks of a heat-resistant substance and successively fixing these blocks as with proper fitting parts. This is a commendable and yet nonexclusive example.

The method for constructing the highly endurable heat insulating material fit for a varying use mentioned above is characterized by placing inorganic heat insulating fibers on a shell, refractory article, or concrete sheet, applying the raw material composition of a surface hardening material to the surface of the layer of the fibers mentioned above, and subsequently flame spraying a fire-resistant ceramic powder on the raw material composition of the surface hardening material or the coating film thereof thereby forming thereon a flame sprayed film of the fire-resistant ceramic substance. When the highly endurable heat insulating material is produced in advance and the produced material is severally put to a given use, the adjoining pieces of the produced material possibly fail to produce a satisfactory heat insulating effect because the joints in the adjoining pieces tend to form gaps. The method of construction which is contemplated by this invention is efficient because it simultaneously carries out the production of the highly endurable heat insulating material and the fabrication thereof fit for a given use and is capable of forming a flame sprayed film which is strong and devoid of a slit. The adjoining slabs of fibers placed in advance at given regions excel in a heat insulating effect because the joint parts thereof are enabled by lava flame spraying to form continuous flame sprayed films without any break. Further, this method is effective for a use or at a region which defies management with such articles as uniform blocks and therefore necessitates spot alignment.

EXAMPLE 1

As blocks of inorganic heat insulating fibers, fiber blocks 1 having a chemical composition shown in Table 1 below (fibers measuring 4 $\mu$m in average diameter and blocks measuring 300 mm in width, 300 mm in length, and 300 in thickness; the measurement in the direction of length performed after the relevant texture had been compressed to 30% from the state devoid of external exertion of weight, and blocks having a density of 130 kg/m$^3$) were used.

The fiber blocks 1 were seated on part of a TD cover. The surfaces of these fiber blocks 1 were coated with the raw material composition of a surface hardening material (specific percentage composition necessary for formation of a coating film of surface hardening material shown in Table 1: 40% of alumina, 9% of silica, 1% of zirconia, 50% of water plus 2% of an aqueous 10% PVA solution based on 100% of the total of the components mentioned above) by spraying till a use quantity of 8 kg/m$^2$ (solid content alone 4 kg/m$^2$). The applied layer of the composition was left drying spontaneously for 30 minutes and dried with the flame of a flame sprayer at 1000° C. for 5 minutes.

By flame spraying a fire-resistant ceramic powder composed of 70 mass % of an alumina powder having the largest particle diameter of 210 $\mu$m and 30 mass % of a silica powder having the largest particle diameter of 210 $\mu$m as shown in Table 1 below and oxygen and LPG added thereto as illustrated in FIG. 2 together by means of a lava flame spraying burner on the surface of the applied layer of the raw material composition of the surface hardening material, the raw material composition of the surface hardening material was calcined by the lava flame spraying to form a coating film 1 of the surface hardening material 3 mm in thickness and a product of flame spraying 1 as a flame sprayed film of a fire-resistant ceramic substance measuring 3 mm in thickness and having a use quantity of 5 kg/m$^2$ and obtain a highly endurable heat insulating material (1) and, at the same time, produce a TD cover (1) possessing the highly endurable heat insulating material (1) as part of a fire-resistant substance. The thickness of the coating film 1 and that of the product of flame spraying 1 were invariably determined by a procedure of forming a product of flame spraying, embedding this product in a resin matrix, and visually examining the cross section of the resultant embedment. The chemical compositions of the coating film 1 of the surface hardening material and the product of flame spraying 1 consequently obtained are shown in Table 1 below.

Next, the highly endurable heat insulating material (1) and the TD cover (1) obtained as described above were tested for adhesiveness (buoyance of the product of flame spraying) and depth of melting loss, tried in an actual furnace (residue of flame spraying or state of damage), and subjected to overall rating. The results are shown in Table 2 below.

EXAMPLE 2

A highly endurable heat insulating material (2) was obtained and, at the same time, a TD cover (2) having the highly endurable heat insulating material (2) as part of a fire-resistant substance thereof was manufactured by following the procedure of Example 1 while changing the thickness of the product of flame spraying 1 from 3 mm to 10 mm.

Then, the highly endurable heat insulating material (2) and the TD cover (2) obtained consequently were tested for adhesiveness (buoyance of the product of flame spraying) and depth of melting loss, tried in an actual furnace (residue of flame spraying or state of damage), and subjected to overall rating. The results are shown in Table 2 below.

EXAMPLE 3

A highly endurable heat insulating material (3) was obtained and, at the same time, a TD cover (3) having the highly endurable heat insulating material (3) as part of a fire-resistant substance thereof was manufactured by following the procedure of Example 1 while using fiber blocks 2 having a chemical composition shown in Table 1 below (fibers measuring 3 μm in average diameter and blocks measuring 300 mm in width, 300 mm in length, and 300 in thickness; the measurement in the direction of length performed after the relevant texture had been compressed to 30% from the state devoid of external exertion of weight, and blocks having a density of 130 kg/m$^3$) in the place of the fiber blocks 1 and forming a product of flame spraying 2 as a flame sprayed film of a fire-resistant ceramic substance measuring 3 mm in thickness and having a use quantity of 5 kg/m$^2$ by flame spraying a fire-resistant ceramic powder composed of 85 mass % of an alumina powder having the largest particle diameter of 210 μm and 15 mass % of a magnesia powder having the largest particle diameter of 210 μm together with oxygen and LPG added as illustrated in FIG. 2 by means of a lava flame spraying burner in the place of the product of flame spraying 1.

Then, the highly endurable heat insulating material (3) and the TD cover (3) obtained consequently were tested for adhesiveness (buoyance of the product of flame spraying) and depth of melting loss, tried in an actual furnace (residue of flame spraying or state of damage), and subjected to overall rating. The results are shown in Table 2 below.

EXAMPLE 4

A highly endurable heat insulating material (4) was obtained and, at the same time, a TD cover (4) having the highly endurable heat insulating material (4) as part of a fire-resistant substance thereof was manufactured by following the procedure of Example 3 while changing the thickness of the product of flame spraying 2 from 3 mm to 10 mm.

Then, the highly endurable heat insulating material (4) and the TD cover (4) obtained consequently were tested for adhesiveness (buoyance of the product of flame spraying) and depth of melting loss, tried in an actual furnace (residue of flame spraying or state of damage), and subjected to overall rating. The results are shown in Table 2 below.

Control 1

A highly endurable heat insulating matrial (1) for comparison was obtained and, at the same time, a TD cover (1) for comparison possessing the highly endurable heat insulating material (1) for comparison as part of a fire-resistant substance thereof was manufactured by following the procedure of Example 1 while having the same fiber blocks as in Example 1 placed on part of the TD cover.

Then, the highly endurable heat insulating material (1) for comparison and the TD cover (1) for comparison obtained consequently were tested for adhesiveness (buoyance of the product of flame spraying) and depth of melting loss, tried in an actual furnace (residue of flame spraying or state of damage), and subjected to, overall rating. The results are shown in Table 2 below.

Control 2

The same fiber blocks 1 as used in Example 1 were placed on part of a TD cover. The surfaces of the fiber blocks 1 were coated with the same raw material composition of surface hardening material as used in Example 1 by blowing the composition till a use quantity of 16 kg/m$^2$ (solid component alone 8 kg/m$^2$). The applied layer was dried and then calcined at 1000° C. to form a coating film 1 for comparison of the surface hardening material 6 mm in thickness and obtain a highly endurable heat insulating material (1) for comparison and, at the same time, manufacture a TD cover (2) for comparison possessing the highly endurable heat insulating material (2) as part of a fire-resistant substance thereof.

Then, the highly endurable heat insulating material (2) for comparison and the TD cover (2) for comparison obtained consequently were tested for adhesiveness (buoyance of the product of flame spraying) and depth of melting loss, tried in an actual furnace (residue of flame spraying or state of damage), and subjected to overall rating. The results are shown in Table 2 below.

Control 3

The same fiber blocks 1 as used in Example 1 were placed on part of a TD cover. By flame spraying the same fire-resistant ceramic powder as used in Example 1 in the same manner as in Example 1 on the surfaces of the fiber blocks 1, a product of flame spraying 1 was formed and a highly endurable heat insulating material (3) for comparison was obtained and, at the same time, a TD cover (3) for comparison possessing the highly endurable heat insulating material (3) as part of a fire-resistant substance thereof was manufactured.

Then, the highly endurable heat insulating material (3) for comparison and the TD cover (3) for comparison obtained consequently were tested for adhesiveness (buoyance of the product of flame spraying) and depth of melting loss, tried in an actual furnace (residue of flame spraying or state of damage), and subjected to overall rating. The results are shown in Table 2 below.

Control 4

The same fiber blocks 1 as used in Example 1 were placed on part of a TD cover. By flame spraying the same fire-resistant ceramic powder as used in Example 3 in the same manner as in Example 3 on the surfaces of the fiber blocks 1, a product of flame spraying 2 was formed and a highly endurable heaat insulating material (4) for comparison was obtained and, at the same time, a TD cover (4) for comparison possessing the highly endurable heat insulating material (4) as part of a fire-resistant substance thereof was manufactured.

Then, the highly endurable heat insulating material (4) for comparison and the TD cover (4) for comparison obtained consequently were tested for adhesiveness (buoyance of the product of flame spraying) and depth of melting loss, tried in an actual furnace (residue of flame spraying or state of damage), and subjected to overall rating. The results are shown in Table 2 below.

TABLE 1

|  |  | Fiber block 1 | Fiber block 2 | Coating film of surface hardening material | Product of flame spraying 1 | Product of flame spraying 2 |
|---|---|---|---|---|---|---|
| Chemical component (mass %) | $Al_2O_3$ | 70 | 35 | 80 | 70 | 85 |
|  | $SiO_2$ | 30 | 50 | 18 | 30 | — |
|  | MgO | — | — | — | — | 15 |
|  | $ZrO_2$ | — | 15 | 2 | — | — |

TABLE 2

|  | Example | | | | Control | | | |
|---|---|---|---|---|---|---|---|---|
| No. | 1 | 2 | 3 | 4 | 1 | 2 | 3 | 4 |
| Item of test | | | | | | | | |
| Thickness of fiber block 1 (mm) *1 | 300 | 300 | — | — | 300 | 300 | 300 | 300 |
| Thickness of fiber block 2 (mm) *2 | — | — | 300 | 300 | — | — | — | — |
| Thickness of coating film of surface hardening material (mm) *3 | 3 mm | 3 mm | 3 mm | 3 mm | — | 6 mm | — | — |
| Flame sprayed layer | | | | | | | | |
| Product of flame spraying 1 *4 | 3 mm | 10 mm | — | — | — | — | 3 mm | — |
| Product of flame spraying 2 *5 | — | — | 3 mm | 10 mm | — | — | — | 3 mm |
| Adhesiveness (thickness of product of flame spraying) | ○ | ○ | ○ | ○ | — | — | Δ-x | Δ-x |
| Depth of melting loss (mm) *6 | Absence of corrosion | Absence of corrosion | Absence of corrosion | Absence of corrosion | 65 mm | 50 mm | Absence of corrosion | Absence of corrosion |
| Trial in actual furnace (residue of flame spraying or state of damage) *7 | >3 months | >3 months | >3 months | >3 months | Large melting loss | Large melting loss | lack of flame sprayed layer after 2 days | lack of flame sprayed layer after 2 days |
| Rating | ◎ | ◎ | ◎ | ◎ | x | x | x | x |

*1, 2, 3, 4, and 5: The relevant fiber blocks, coating films of surface hardening material, and products of flame spraying possessing the respective chemical compositions shown in Table 1 above.
*6: The depth of corrosion which occurred when a mill scale in a molten state was blown for 10 seconds by means of a lava flame sprayer on the coating film of a product of lava flame spraying, a face of fiber block, or surface hardening material was measured. The absence of corrosion indicates that the mill scale adhered to the surface of a product of flame spraying but induced no state of melting loss.
*7: A relevant sample was placed on part of the TD cover and periodically inspected to determine the state of damage and the presence or absence of endurableness.

Method for Performing the Test Mentioned Above and Standard of Rating (1) Adhesiveness (Thickness of Product of Flame Spraying)

Method for performing the test: The adhesiveness (buoyance or separation of a product of flame spraying) between a given product of flame spraying which had undergone flame spraying (the flame temperature 2400° C.) at a rate in the range of 5–10 minutes/m² and a given layer of fibers or a given coating film of surface hardening material was rated by visual observation of the adjoining layers and by a microscopic observation of the cross section of a resin matrix having the adjoining layers embedded therein.

Scale of Rating:
  ○ . . . Satisfactory adhesiveness as evinced by the absence of a discernible sign of buoyance of a given product of flame spraying;
  Δ . . . Unsatisfactory adhesiveness as evinced by the porosity of the texture of a flame sprayed layer;
  X . . . Separation between the flame sprayed layer and the layer of fibers.

(2) Depth of Melting Loss

Method of testing: The depth of corrosion formed when a mill scale in a molten state was blown at a rate of 10 seconds/m² by flame spraying (the flame temperature 2400° C.) on a coating film of a product of flame spraying, fibers, or a surface hardening material was measured.

Scale of rating: The absence of corrosion indicates that the mill scale adhered to the surface of a product of flame spraying but induced no melting loss. The numerical value represents the result of determination of the depth of corrosion visually found as the distance from the initial wholesome surface. The presence or absence of melting loss was discerned from the shape of the cross section of a given sample embedded in a resin matrix.

(3) Trial in Actual Furnace (Residue of Flame Spraying or Condition of Damage)

Method of testing: A sample was placed on part of a TD cover and put to use in an actual TD. The species of steel was ordinary steel. The actual use was performed one to three times daily, using a molten steel temperature in the range of 1550°–1580° C., the ambient temperature in the proximity of the TD cover kept at about 1800° C. by means of a plasma heating device, and a casting time in the range of 300–450 minutes. When the splash generated during the course of casting induced adhesion of scale to the TD cover, the damage caused by this adhesion was visually observed.

Scale of rating: The region of a sample on the TD cover was visually inspected to determine the size of melting loss and the presence or absence of chip or separation in the region of flame spraying.

In Examples 1 through 4, the regions of flame spraying showed no sign of chip separation and barely showed a discernible sign of slight melting loss after the elapse of three months. Thus, the samples were judged to be usable in future.

In Controls 1 and 2, the samples sustained a heavy melting loss after one round of use. In Controls 3 and 4, the samples, when observed after two rounds of use, were found to sustain chip separation in the regions of flame spraying.

(4) Overall Rating

In Examples 1 through 4, the samples were rated as excelling in heat resistance, resistance to thermal impulse, resistance to slag, resistance to molten iron, and resistance to mechanical shock besides the resistance to scale mentioned above on the ground that they withstood use over a period totaling three months at elevated temperatures, tolerated repeated rises and falls of temperature through successive rounds, proved safely usable in spite of the adhesion of slag to part thereof, and afforded safe use in spite of the scattering of molten iron. In Controls 1 through 4, the samples were rated as lacking endurableness enough to stand comparison.

EXAMPLE 5

As blocks of inorganic heat insulating fibers, fiber blocks 1 tolerating heat to 1600° C. as shown in Table 1, formed of 70% of alumina and 30% of silica, provided with a crystal layer of mullite, and the blocks each measuring 300 mm in width, 300 mm in length, and 300 mm in thickness were used.

To the surfaces of the blocks mentioned above, the raw material composition of a surface hardening material (the raw material composition of the surface hardening material destined to form a coating film of surface hardening material shown in Table 1: specific percentage composition; 40% of alumina, 9% of silica, 1% of zirconia, and 50% of water plus 2% of an aqueous 10% solution of PVA based on 100% of the total of the components mentioned above) was applied by spraying. The resultant applied layer was immediately dried with the flame of a flame spraying burner. Then, the fire-resistant ceramic powder formed of an alumina-silica type powder having the largest article diameter of 210 μm or an alumina-magnesia type powder having the largest particle diameter of 210 μm was lava flame sprayed on the dried layer to form a flame sprayed film about 2 mm in thickness and manufacture a highly endurable heat insulating material (5). A section of the highly endurable heat insulating material (5) thus obtained was observed under a stereoscopic microscope to determine the texture thereof. A magnified diagram (photographic copy) illustrating the texture appearing in the cross section is shown in FIG. 3(a).

Figure 3A:
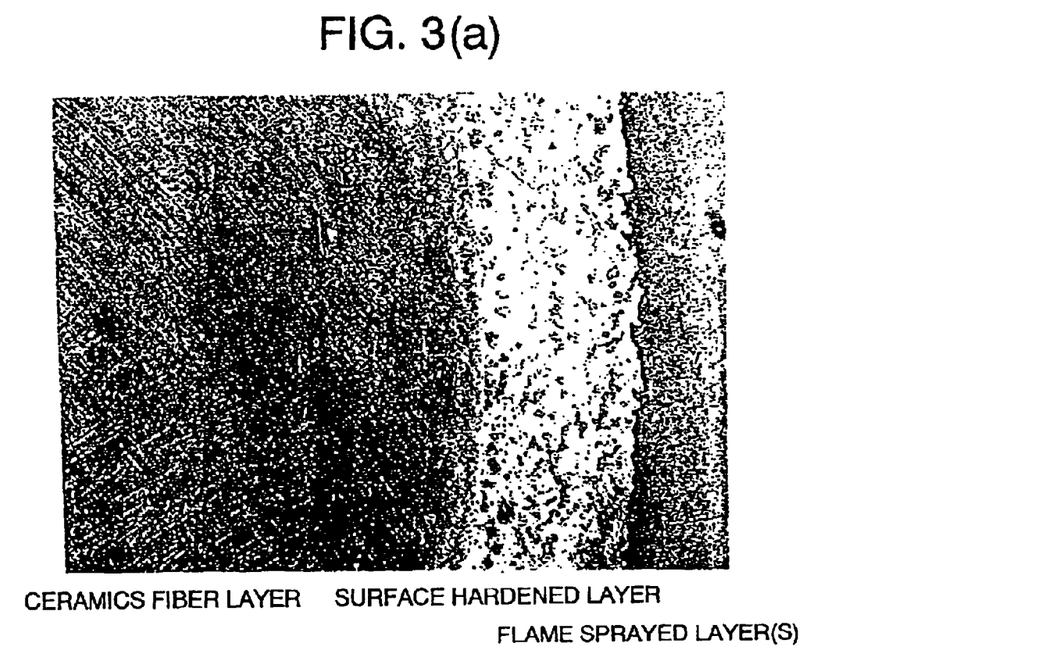
FIG. 3(a) is a magnified diagram (photographic reproduction) illustrating the texture of a highly endurable heat insulating material (5) manufactured in Example 5 and appearing in a cross section and FIG. 3(b) is a magnified diagram (photographic reproduction) illustrating the texture of a highly endurable heat insulating material (5) for comparison manufactured in Comparative Example 5 and appearing in a cross section.

The results of observation illustrated in FIG. 3(a) endorse the type section shown in FIG. 1(d) mentioned above. To be specific, ① the flame sprayed layer was a comparatively dense product of processing. ② The outermost surface of the flame sprayed layer was smooth. ③ The layer of surface hardening materia intervening between the flame sprayed layer and the layer of fibers permeated the layer of fibers. ④ No sign of discernible separation was found between the flame sprayed layer and the layer of fibers.

Control 5

As blocks of inorganic heat insulating fibers, fiber blocks 1 tolerating heat to 1600° C. as shown in Table 1, formed of 70% of alumina and 30% of silica, provided with a crystal layer of mullite, and the blocks each measuring 300 mm in width, 300 mm in length, and 300 mm in thickness were used.

A flame sprayed film about 2 mm in thickness was formed and a highly endurable heat insulating material (5) for comparison was manufactured by lava flame spraying the fire-resistant ceramic powder formed of an alumina-silica type powder having the largest particle diameter of 210 μm or an alumina-magnesia type powder having the largest particle diameter of 210 μm with the flame of a flame spraying burner on the surfaces of the blocks mentioned above. A cross section of the highly endurable heat insulating material (5) obtained as described above was observed under a stereoscopic microscope to determine the texture thereof. A magnified diagram (photographic copy) illustrating the texture appearing in the cross section is shown in FIG. 3(b).

Figure 3B:
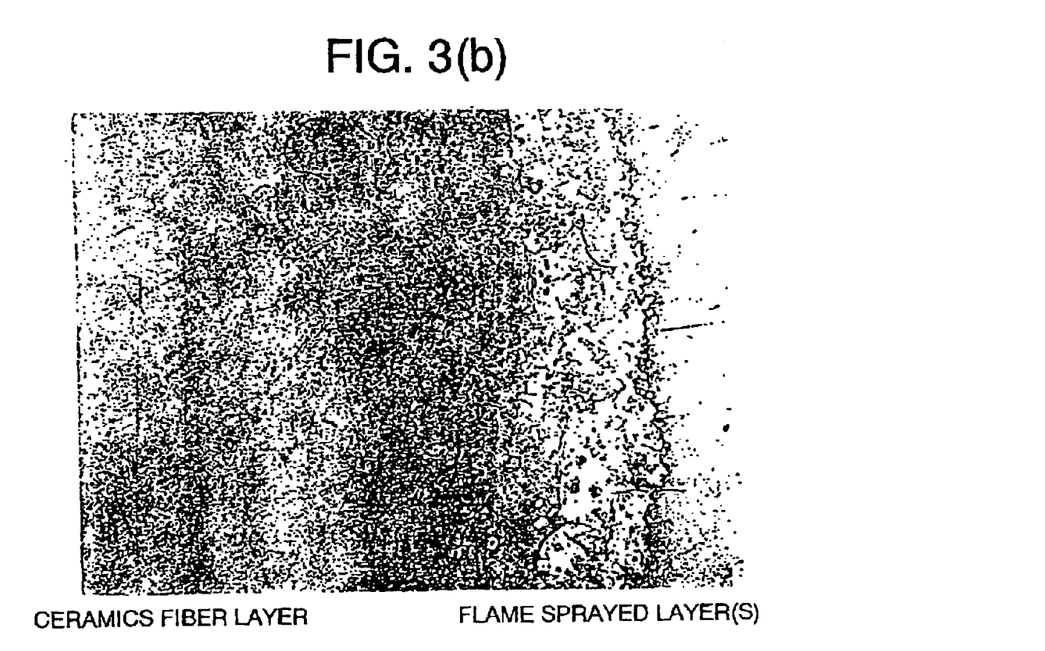

The results of observation illustrated in FIG. 3(b) endorse the type section shown in FIG. 1(b) mentioned above. To be specific, ① The flame sprayed layer was a comparatively porous product of processing. ② The outermost surface of the flame sprayed layer showed a conspicuous sign of undulation. ③ A sign of separation was found between the flame sprayed layer and the layer of fibers.

INDUSTRIAL APPLICABILITY

The highly endurable heat insulating material according to this invention is enabled to form a strong flame sprayed film because it is provided on the surface of a layer of inorganic heat insulating fibers through the medium of a coating film of surface hardening material with a flame sprayed film of a fire-resistant ceramic material and because the coating film of the surface hardening material fulfills the role of a bond (binder) between the layer of fibers and the flame sprayed film and manifests high adhesiveness to these opposed layers. This flame sprayed film, therefore, excels in resisting corrosion as manifested in preventing the attack of a mill scale or an alkali and, at the same time, produces a great effect in protecting the composition of fibers against breakage possibly caused by high-speed hot wind or dust.

The method of this invention for the production of the highly endurable heat insulating material, by a procedure which comprises applying the raw material composition of a surface hardening material to the surface of a layer of inorganic heat insulating fibers and then flame spraying a fire-resistant ceramic substance on the layer of raw material composition of the surface hardening material thereby forming a flame sprayed film of a fire-resistant ceramic substance, is enabled to form the flame sprayed film of the fire-resistant ceramic substance excelling in resisting mechanical impulse and consequently produce a highly endurable heat insulating material endowed with excellent endurableness.

Further, the furnaces, smoke discharging devices, and tunnels for which the highly endurable heat insulating material of this invention is used are enabled, by having the highly endurable heat insulating material as part or the whole of a fire-resistant substance thereof, to materialize a decrease in weight and a reduction in thickness as compared with the existing refractory articles such as bricks and, therefore, acquire satisfactory operational efficiency in the aspect of handling, excel in endurableness, and enjoy a generous improvement in service life.

As regards the method for processing the highly endurable heat insulating material so as to suit the various uses contemplated by this invention, the fabrication of the highly endurable heat insulating material for the sake of various uses, by resorting to a procedure which comprises placing inorganic heat insulating fibers on a shell, refractory article, or concrete, applying a surface hardening agent to the surface of the layer of the fibers mentioned above, and then forming a film of a fire-resistant ceramic substance on the layer of the surface hardening agent by lava flame spraying, is enabled to form efficiently a flame sprayed film strong and devoid of a break. This method proves effective and efficient for a use and at a region which necessitates spot alignment.

What is claimed is:

1. A highly endurable heat insulating material consisting of being provided on the surface of a layer of inorganic heat insulating fibers with a frame sprayed film of a fire-resistant ceramic substance through the medium of a coating film of a surface hardening material.

2. A highly endurable heat insulating material according to claim 1, wherein the inorganic heat insulating fiber is formed of one member or a combination of two or more members selected from the group consisting of alumina-silica substance, clay substance, zirconia, mullite, zircon, magnesia, calcia, dolomite, silicon carbide, silicon nitride, and carbon fibers.

3. A highly endurable heat insulating material according to claim 1, wherein the high-temperature property of the surface hardening material is similar to the high-temperature property of the flame sprayed film of a fire-resistant ceramic substance.

4. A highly endurable heat insulating material according to claim 1, wherein the fire-resistant ceramic substance is at least one member selected from the group consisting of simple substances of alumina-silica substance, refractory clay, zirconia, mullite, zircon, magnesia, calcia, dolomite, corundum, bauxite, alumstone, silicon carbide, and chromite and complexes thereof.

5. In the production of a highly endurable heat insulating material according to claim 1, a method for the production of the highly endurable heat insulating material characterized by coating the surface of an inorganic heat insulating fiber with the raw material composition for the surface hardening material and then flame spraying a fire-resistant ceramic powder material on the raw material composition of the surface hardening material thereby forming a coating film of the surface hardening material and the flame sprayed film of the heat-resistant ceramic substance.

6. A furnace comprising possessing a highly endurable heat insulating material set forth in claim 1 as part or whole of a fire-resistant article.

7. In working a highly endurable heat insulating material for the use set forth in claim 6, a working method characterized by setting an inorganic heat insulating fiber on an iron skin, a fire-resistant substrate, or a concrete, applying a surface hardening agent to the surface of the fiber, and subsequently forming a film of a fire-resistant ceramic substance by frame spraying on the coat of the surface hardening agent.

8. A smoke discharging device comprising possessing a highly endurable heat insulating material set forth in claim 1 as part or whole of a fire-resistant article.

9. In working a highly endurable heat insulating material for the use set forth in claim 8, a working method comprising setting an inorganic heat insulating fiber on an iron skin, a fire-resistant substrate, or concrete, applying a surface hardening agent to the surface of the fiber, and subsequently forming a film of a fire-resistant ceramic substance by flame spraying on the coat of the surface hardening agent.

10. A tunnel comprising possessing a highly endurable heat insulating material set forth in claim 1 as part or whole of a fire-resistant article.

11. In working a highly endurable heat insulating material for the use set forth in claim 10, a working method comprising setting an inorganic heat insulating fiber on an iron skin, a fire-resistant substrate, or concrete, applying.a surface hardening agent to the surface of the fiber, and subsequently forming a film of a fire-resistant ceramic substance by flame spraying on the coat of the surface hardening agent.

* * * * *